United States Patent Office 3,595,915
Patented July 27, 1971

3,595,915
POLYCHLOROETHYLTHIO AND POLYCHLORO-
VINYLTHIO CARBOXYLIC ACID AMIDES
Carl D. Emerson, Kansas City, Mo., and Paul C.
Aichenegg, Prairie Village, Kans., assignors to Chemagro Corporation, New York, N.Y.
No Drawing. Application Oct. 2, 1964, Ser. No. 401,253, now Patent No. 3,442,941, dated May 6, 1969, which is a continuation of application Ser. No. 841,162, Feb. 5, 1969. Divided and this application Apr. 7, 1970, Ser. No. 24,418
Int. Cl. C07c 103/30
U.S. Cl. 260—561
7 Claims

ABSTRACT OF THE DISCLOSURE

Compounds are prepared having the formula:

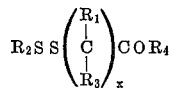

where:

$R_1$ and $R_3$ are selected from the group consisting of hydrogen, lower alkyl, carboxyl lower alkyl, carbocyclic aryl, carbocyclic haloaryl, haloalkyl, and ester of carboxy lower alkyl;
$R_2$ is selected from the group consisting of polyhaloethyl and polyhalovinyl;
$R_4$ is selected from the group consisting of OH, SH, $OR_5$ where $R_5$ is selected from the group consisting of alkyl, carbocyclic aryl, halocarbocyclic aryl, haloalkyl and alkylthioalkyl, $SR_5$,

where:

$R_6$ and $R_7$ are selected from the group consisting of hydrogen, alkyl and carbocyclic aryl or $R_6$ and $R_7$ together with N complete a heterocyclic ring, and OMe where Me is selected from the group consisting of the metals of Groups I, II, VI, VII and VIII of the Periodic Table; and $x$ is an integer from 1 to 2 inclusive. Such materials have been found useful to kill nematodes, fungi and undesirable plants. They also are useful as defoliating agents.

The present invention relates to novel disulfide acids and their derivatives and uses thereof.

This application is a division of copending application Ser. No. 401,253, filed Oct. 2, 1964 and now Pat. 3,442,941, issued May 6, 1969 and is continuation of application 841,162, filed Feb. 5, 1969 and now abandoned.

It is an object of the present invention to prepare novel disulfide acids and their derivatives.

Another object is to prepare novel pesticidal compositions.

A more specific object is to kill nematodes.
A further object is to kill fungi.
An additional object is to prepare novel herbicides.
Yet another object is to defoliate cotton, beans and other plants.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing compounds having the formula

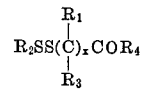

where $R_1$ and $R_2$ are hydrogen, lower alkyl, carboxyl lower alkyl, carbocyclic aryl or carbocyclic or haloalkyl and ester of carboxy lower alkyl; $R_2$ is polychloroethyl polychlorovinyl; $R_4$ is OH, SH, $OR_5$ is alkyl, aryl, haloaryl, haloalkyl, or alkylthioalkyl,

where $R_6$ and $R_7$ are hydrogen, alkyl or aryl, or together with N complete a heterocyclic ring, or $SR_5$ where $R_5$ is as previously defined, or OM, where M is a metal of Groups I, II, VI, VII or VIII of the Periodic Table, e.g. sodium, potassium, calcium, barium, chromium, tungsten, zinc, silver, mercury, iron, manganese, magnesium, cobalt, nickel, copper or lithium, and $x$ is 1 or 2.

The compounds of the present invention have wide biological actvity and are useful as bactericides, nematocides, fungicides, defoliants and herbicides, especially post-emergent herbicides.

They can be prepared by reacting equimolar amounts of a compound having the formula $R_2SCl$ with a compound having the formula

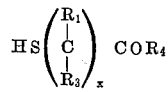

and removing the HCl byproduct.

It is well known that compounds having a perchloromethyl group function differently than compounds having a polychloroethyl group. The 2,2,2-trichloroethyl group and the 1,2,2-trichloroethyl group can be converted to the 2,2-dichlorovinyl group and the 1,2-dichlorovinyl group by dehydrohalogenation. There is no possibility of forming thiophosgene with the compounds of the present invention whereas there is such a likelihood with compounds containing the perchoromethylthio group.

Many of the compounds of the present invention have an asymmmetrical carbon atom. Such compounds exist in both the dextro and levo forms as well as a racemic mixture. While all these forms are useful it has been observed that in some cases there is a difference in activity between the dextro and levo rotary forms.

The general procedures employed for preparing the products of the invention were as follows:

(1) Amides of the free acids

The acid chloride of the chosen disulfide acid was diluted with dry chloroform, carbon tetrachloride or diethyl ether. Two equivalents of the appropriate amine were dissolved in the same diluent and added dropwise at 15–20° C. The mixture was filtered to remove amine hydrochloride, the organic solution washed with water, dried over anhydrous magnesium sulfate and vacuum stripped to give the amide in yields of 90% to quantitative.

Unless otherwise indicated all parts and percentages are by weight.

The preferred polyhaloethyl compounds are trichloroethyl compounds.

Illustrative of compounds within the present invention are S-(1,2,2 - trichloroethylthio)-thiolactamide, S-(1,2,2- trichloroethylthio)-N,N-diethylthiolactamide, S-(1,2,2-trichloroethylthio)-thiolactanilide, S-(1,2,2 - trichloroethylthio)-β-mercapto-propionic acid, N-(S-(1,2,2-trichloroethylthio) - thioglycolyl) - morpholine, N - (S - 1,2,2-trichloroethylthio) - thioglycolyl - phthalimide, S - (2,2,2 - trichloroethylthio-N-methylthioglycolamide.

EXAMPLE 1

To 18.4 grams of thioglycolic acid (0.2 mole) in chloroform there were added dropwise 40.0 grams (0.2 mole) of 1,2,2-trichloroethyl sulfenyl chloride at 30–35° C. The product was washed with water, dried and vacuum stripped to give S-(1,2,2-trichloroethylthio)-thioglycolic acid in a 96% yield as a faintly yellow oil $n_D^{20}$ 1.5846, percent Cl 41.4% (theory 41.7%), percent S 24.5% (theory 25.1%).

EXAMPLE 2

To 10.6 grams of thiolactic acid (0.1 mole) in chloroform there were added dropwise 20.0 grams (0.1 mole) of 1,2,2-trichloroethyl sulfenyl chloride at 30–35° C. The product was washed with water, dried and vacuum stripped to give S-(1,2,2-trichloroethylthio)-thiolactic acid in a 97% yield as a faintly yellow oil, $n_D^{20}$ 1.5647, percent Cl 39.7% (theory 39.6%).

EXAMPLE 3

27 grams (0.1 mole) of the product of Example 2 was treated with 11.9 grams of thionyl chloride (0.1 mole) at 75° C., the mixture vacuum stripped and to the residue dissolved in chloroform, there were added dropwise 3.4 grams of ammonia also dissolved in chloroform. The amine hydrochloride was filtered off and the product purified as set forth supra in method 3 to give S-(1,2,2-trichloroethylthio)-thiolactamide in a 95% yield as a light yellow oil, $n_D^{28}$ 1.5641.

EXAMPLE 4

The procedure of Example 3 was repeated using 13.5 grams of the product of Example 2 with 6.0 grams of thionyl chloride and the chloroform solution of ammonia was replaced by a chloroform solution containing 7.3 grams (0.1 mole) of diethyl amine to produce S-(1,2,2-trichloroethylthio)-N,N-diethyl-thiolactamide in a 98% yield as a dark oil.

EXAMPLE 5

The procedure of Example 3 was repeated using 27 grams of the product of Example 2 with 16 grams of thionyl chloride and replacing the chloroform solution of ammonia with an ether solution of 18.6 grams (0.2 mole) of aniline to produce S-(1,2,2-trichloroethylthio)-thiolactanilide in a 93% yield as a brownish oil.

EXAMPLE 6

12.8 grams (0.05 mole) of the product of Example 1 was treated with 6.0 grams (0.05 mole) of thionyl chloride at 70° C., the mixture vacuum stripped and to the residue dissolved in chloroform there was added dropwise 8.7 grams (0.1 mole) of morpholine in chloroform at 10–15° C. The product was purified as described in Example 15 and there was obtained N-(S-(1,2,2-trichloroethyl-thio)-thioglycolyl) morpholine in a quantitative yield as brown oil, $n_D^{20}$ 1.5711.

EXAMPLE 7

The procedure of Example 6 was repeated but the reaction of the 12.8 grams of the product of Example 1 with 6.0 grams of thionyl chloride was carried out at 75° C. and the morpholine was replaced by 9.25 grams of potassium phthalimide which was added at 30–35° C. to produce N - S-(1,2,2-trichloroethylthio)-thioglycolyl-phthalimide as a buff colored solid.

The compounds of the present invention can be used alone as nematocides, fungicides, herbicides and defoliants but it has been found desirable to apply them to the pest or plant together with inert solids to form dusts, or more preferably suspended in a suitable liquid diluent, preferably water. There can also be added surface active agents and inert solids in such liquid formulations. Desirably, 0.05–1% by weight of surface active agent is employed. The active ingredient can be from 0.01 to 95% by weight of the entire composition in such cases.

In place of water where can be employed organic solvents as carriers, e.g. hydrocarbons such as benzene, toluene, xylene, kerosene, diesel oil, fuel oil, and petroleum naphtha, ketones such as acetone, methyl ethyl ketone and cyclohexanone, chlorinated hydrocarbons such as carbon tetrachloride, chloroform, trichloroethylene and perchloroethylene, esters such as ethyl acetate, amyl acetate and butyl acetate, ethers, e.g., ethylene glycol monomethyl ether and diethylene glycol monomethyl ether, alcohols, e.g. ethanol, isopropanol and amyl alcohol, etc.

The novel materials can also be applied as aerosols, e.g. by dispersing them in air by means of a compressed gas such as dichlorodifluoromethane or trichlorofluoromethane and other Freons for example.

The materials of the present invention can also be applied with inert adjuvants or carriers such as talc, pyrophyllite, synthetic, fine silica, Attaclay, kieselguhr, chalk, diatomaceous earth, lime, calcium carbonate, bentonite, fuller's earth, cottonseed hulls, wheat flour, soyabean flour, pumice, tripoli, wood flour, walnut shell flour, redwood flour and lignin.

It is frequently desirable to incorporate a surface active agent in the pesticidal compositions of this invention. Such surface active agents, i.e. wetting agent, are advantageously employed in both the solid and liquid compositions. The surface active agent can be anionic, cationic or nonionic in character.

Typical classes of surface active agents include alkyl sulfonate salts, alkylaryl sulfonate salts, alkyl sulfate salts, alkylamide, sulfonate salts, alkylaryl polyether alcohols, fatty acid esters of polyhydric alcohols and the alkylene oxide addition products of such esters, and addition products of long chain mercaptans and alkylene oxides. Typical examples of such surface active agents include the sodium alkyl benzene sulfonates having 14 to 18 carbon atoms in the alkyl group, alkylphenolethylene oxide condensation products, e.g. p-isooctylphenol condensed with 10 ethylene oxide units soaps, e.g. sodium stearate and potassium oleate, sodium salt of propylnaphthalene sulfonic acid, (di - 2 - ethyl hexyl) ester of sodium sulfosuccinic acid, sodium lauryl sulfate, sodium salt of the sulfonated monoglyceride of cocoanut fatty acids, sorbitan sesquioleate, lauryl trimethyl ammonium chloride, octadecyl trimethyl ammonium chloride, polyethylene glycol lauryl ether, polyethylene esters of fatty acids and rosin acids, e.g. Ethofat 7 and 13, sodium N-methyl-N-oleyl-taurate, Turkey red oil, sodium dibutylnaphthalene sulfonate, sodium lignin sulfonate (Marasperse N), polyethylene glycol stearate, sodium dodecylbenzene sulfonate, tertiary dodecyl polyethylene glycol thioether (Nonionic 218), long chain ethylene oxide propylene oxide condensation products, e.g. Pluronic 61, sorbitan monolaurate, polyethylene glycol ester of tall oil acids, sodium octylphenoxyethoxyethyl sulfate, tris (polyoxyethylene) sorbitan monostearate (Tween 60), sodium dihexyl sulfosuccinate.

The solid and liquid formulations can be prepared by any of the conventional methods. Thus the active ingredient can be mixed with the solid carrier in finely divided form in amounts small enough to preserve the freeflowing property of the final dust composition.

In the following examples or tables the disulfides were formulated as wettable powders consisting of 50% of the disulfide, 46% Hi-Sil 233 (ultra fine silica), 2% Marasperse N (sodium lignin sulfonate) and 2% Pluronic L–61 (polyethylene oxidepropylene oxide molecular weight about 1000). This wettable powder is hereinafter designated as Formulation A.

These 50% by weight disulfide containing wettable powders were diluted with water to such an extent as to obtain final concentrations of the disulfides of 200, 100, 50, 25, 12.5 p.p.m. during the actual tests.

The saprophytic nematode tests were carried out in water as the medium with Panagrellus and Rhabditis spp. at room temperature. The results were recorded as percent kill after a 4 days incubation period. The blank mortality was 0–10% kill.

The saprophytic nematode test results are set forth in Table 1.

TABLE 1

| Compound of Example: | Percent kill of saprophytic nematodes at rates p.p.m. | | | | |
|---|---|---|---|---|---|
| | 200 | 100 | 50 | 25 | 12.5 |
| 3 | 100 | 100 | 100 | 100 | 80 |
| 5 | 50 | 50 | 30 | 0 | 0 |
| 6 | 80 | 50 | 30 | 0 | 0 |
| 7 | 30 | 0 | 0 | 0 | 0 |

The most active nematocide was the compound of Example 3. In commercial practice the compositions containing the nematocides of the present invention are applied to the soil infected with nematodes.

The compounds were also tested as fungicides in plate fungicide tests as indicated in Table 2. The compounds were made up into Formulation A and then added to agar cultures of the fungi. In the table 10 indicates 100% effectiveness and 0 indicates no effectiveness as a fungicide. In Table 2 P stands for *Pythium irregulare*, R for *Rhizoctonia solani*, H for *Helminthosporium sativum* and F for *Fusarium oxysporum*. The concentrations are expressed as p.p.m.

TABLE 2

| Compound of Example: | P | | | R | | | H | | | F | | |
|---|---|---|---|---|---|---|---|---|---|---|---|---|
| | 1,000 | 100 | 10 | 1,000 | 100 | 10 | 1,000 | 100 | 10 | 1,000 | 100 | 10 |
| 13 | 10 | 10 | 5 | 10 | 10 | 5 | 10 | 10 | 10 | 10 | 10 | 10 |
| 14 | 10 | 10 | 10 | 10 | 10 | 10 | 10 | 10 | 10 | 10 | 10 | 8 |
| 15 | 5 | 0 | 0 | 10 | 10 | 5 | 10 | 10 | 8 | 10 | 10 | 8 |
| 6 | 10 | 10 | 5 | 10 | 5 | 5 | 10 | 10 | 8 | 10 | 5 | 5 |
| 7 | 10 | 10 | 5 | 10 | 5 | 5 | 10 | 10 | 0 | 10 | 5 | 5 |

The most effective fungicide was that of Example 3.

The compounds were further tested as fungicides in spore germination tests as indicated in Table 3. The compounds were made up into Formulation A and then tested as inhibitors for germination of spores of Alternaria spp. (A in the table) and Ustilago spp. (U in the table). In the table 10 indicates 100% effectiveness and 0 indicates no effectiveness against spore germination. The concentrations are expressed as p.p.m.

TABLE 3

| Compound of Example: | A | | | U | | |
|---|---|---|---|---|---|---|
| | 1,000 | 100 | 10 | 1,000 | 100 | 10 |
| 3 | 10 | 10 | 8 | 10 | 10 | 8 |
| 4 | 10 | 10 | 10 | 10 | 10 | 10 |
| 5 | 10 | 10 | 8 | 10 | 10 | 8 |
| 6 | 10 | 10 | 2 | | | |
| 7 | 10 | 5 | 2 | | | |

The most effective inhibitors of spore germination were those of Examples 3, 4 and 5.

The compounds were also tested as soil fungicides as indicated in Table 4. The compounds were made up into Formulation A and then added to soil infested with *Pythium irregulare* using peas as a test crop. The concentrations of the fungicides are expressed in lbs./acre. In the table 10 indicates 100% effectiveness and 0 indicates no effectiveness as a soil fungicide.

TABLE 4

| Compound of Example: | 200 | 50 | 25 | 12.5 |
|---|---|---|---|---|
| 4 | 10 | 6 | | |
| 6 | 9 | 9 | 6 | 6 |
| 7 | 6 | 4 | | |

The most effective soil fungicide in this test was that of Example 6.

The compounds were additionally tested as post emergent herbicides as indicated in Table 5. The compounds were made up into Formulation A and then applied to growing plants at the indicated rates in lbs./acre. In the table 10 indicates 100% effectiveness and 0 indicates no effectiveness as a herbicide.

TABLE 5

| | Sugar beets | | | | | Flax | | | | | Oats | | | | | Radish | | | | | Wheat | | | | |
|---|---|---|---|---|---|---|---|---|---|---|---|---|---|---|---|---|---|---|---|---|---|---|---|---|---|
| | 20 | 10 | 8 | 5 | 2 | 20 | 10 | 8 | 5 | 2 | 20 | 10 | 8 | 5 | 2 | 20 | 10 | 8 | 5 | 2 | 20 | 10 | 8 | 5 | 2 |
| Compound of Example: | | | | | | | | | | | | | | | | | | | | | | | | | |
| 6 | | | | | | | 10 | | | 7 | | | 10 | | 3 | | 10 | | | 6 | | 9 | | 6 | |
| 7 | | | | | | | 9 | | | 4 | | | 2 | | 1 | | 5 | | | 7 | | 4 | | 3 | |

| | Wheat |
|---|---|
| 6 | 9 ... 4 |
| 7 | 5 ... 4 |

Some of the compounds were also tested as cotton defoliants as indicated in Table 6. The compounds were made up into Formulation A and then applied to growing cotton plants. The results in the table are expressed as percent cotton defoliation at the indicated application rate in lbs./acre.

TABLE 6

| Compound of Example: | 8 | 4 | 2 |
|---|---|---|---|
| 6 | 79 | | 33 |
| 7 | 23 | | 0 |

Of course care should be taken to be sure that the compounds are applied as cotton defoliants at a lower rate than that at which they have strong herbicidal properties. The compounds are also suitable as defoliants for beans and other plants.

We claim:

1. A compound having the formula

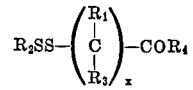

where $R_1$ and $R_3$ are selected from the group consisting of hydrogen and lower alkyl;

$R_2$ is selected from the group consisting of 1,2,2-trichloroethyl 2,2,2-trichloroethyl and dichlorovinyl;

$R_4$ is

where $R_6$ and $R_7$ are seected from the group consisting of hydrogen, lower alkyl and phenyl or $R_6$ and $R_7$ together with N complete a heterocyclic radical selected from the group consisting of morpholino and phthalimido and $x$ is 1 or 2.

2. A compound according to claim 1 wherein $R_6$ and $R_7$ are selected from the group consisting of hydrogen, methyl, ethyl and phenyl or $R_6$ and $R_7$ together with N complete a heterocyclic radical selected from the group consisting of morpholino or phthalimido and $x$ is 1.

3. A compound according to claim 2 wherein $R_2$ is 1,2,2-trichloroethyl or 2,2,2-trichloroethyl.

4. A compound according to claim 1 wherein $R_2$ is dichlorovinyl.

5. A compound according to claim 1 which is S-(2,2,2-trichloroethylthio)thiolactamide.

6. A compound according to claim 1 which is S-(1,2,2-trichloroethylthio)thiolactamide.

7. A compound according to claim 1 which is S-(dichlorovinylthio)thiolactamide.

References Cited
UNITED STATES PATENTS 3,200,146  8/1965  Weil et al. _____ 260—543

ALEX MAZEL, Primary Examiner

R. V. RUSH, Assistant Examiner

U.S. Cl. X.R.

260—247.1, 326S, 562S